US012532367B2

(12) United States Patent
Clevorn et al.

(10) Patent No.: US 12,532,367 B2
(45) Date of Patent: Jan. 20, 2026

(54) ADAPTIVE RADIO OPERATIONAL MODES

(71) Applicant: Apple Inc., Cupertino, CA (US)

(72) Inventors: Thorsten Clevorn, Munich (DE);
Stefan Meyer, Hoechstadt (DE); Bernd W. Adler, San Jose, CA (US);
Bernhard Raaf, Neuried Bavaria (DE);
Josef Hausner, Germering (DE)

(73) Assignee: Apple Inc., Cupertino, CA (US)

( * ) Notice: Subject to any disclaimer, the term of this patent is extended or adjusted under 35 U.S.C. 154(b) by 962 days.

(21) Appl. No.: 17/558,215

(22) Filed: Dec. 21, 2021

(65) Prior Publication Data

US 2023/0086286 A1     Mar. 23, 2023

Related U.S. Application Data

(60) Provisional application No. 63/247,659, filed on Sep. 23, 2021.

(51) Int. Cl.
*H04W 76/15* (2018.01)
(52) U.S. Cl.
CPC .................................. *H04W 76/15* (2018.02)

(58) Field of Classification Search
CPC ... H04W 76/15; H04W 76/16; H04W 36/165; H04L 69/14
See application file for complete search history.

(56) References Cited

U.S. PATENT DOCUMENTS

| 10,895,634 | B2 | 1/2021 | Nath et al. | |
|---|---|---|---|---|
| 2016/0174280 | A1* | 6/2016 | Singh | H04W 76/15 370/329 |
| 2019/0257933 | A1* | 8/2019 | Nath | H01Q 21/064 |
| 2022/0264522 | A1* | 8/2022 | Brusilovsky | H04W 48/18 |

* cited by examiner

*Primary Examiner* — Brian T Le
(74) *Attorney, Agent, or Firm* — Treyz Law Group, P.C.; Tianyi He

(57) ABSTRACT

An electronic device may include wireless circuitry having one or more radios and one or more antennas. A first radio may be configured to establish a communication link with an external device, a second radio may be configured to establish a communication link with network equipment. One or more processors in the electronic device may receive information indicative of a duration and termination of the communication link with the external device to operate the second radio in one or more operational modes. If desired, one of the operational modes may include a low-power idle mode during which the second radio performs discontinuous reception while pausing network paging monitoring.

20 Claims, 9 Drawing Sheets

ADAPTIVE RADIO OPERATIONAL MODES

This application claims the benefit of U.S. provisional patent application No. 63/247,659, filed Sep. 23, 2021, which is hereby incorporated by reference herein in its entirety.

FIELD

This disclosure relates generally to electronic devices, including electronic devices with wireless circuitry.

BACKGROUND

Electronic devices are often provided with wireless capabilities. An electronic device with wireless capabilities has wireless circuitry that includes one or more antennas coupled to one or more radios.

If care is not taken, the wireless circuitry can consume excess power. This can be especially detrimental to a portable electronic device having limited battery capacity. It can be challenging to control wireless circuitry power consumption while providing a user with device functionalities.

SUMMARY

An electronic device may include wireless circuitry having one or more radios and one or more antennas. An electronic device can operate in the presence of an external device and may communicate with the external device via a wireless communication link (e.g., using a non-cellular radio). In some scenarios such as where the electronic device has a limited battery capacity or other scenarios, a radio of the electronic device such as a cellular radio may operate in a mode that reduces power consumption, while the electronic device uses the wireless communication link with the external device (via the non-cellular radio) and the cellular radio of the external device for some cellular radio functions.

As examples, when using the external device for radio functions, the electronic device cellular radio may operate in a first (idle) mode during which the radio operates based on a Discontinuous Receive Cycle and periodically turns on to check for paging messages from the network equipment, in a second (radio-off) mode during which the radio switches off, in a third (airplane) mode during which the radio switches off cellular services but retains operational data in memory. To further reduce power consumption, the electronic device may operate in a fourth (low-power idle) mode during which the radio stores radio databases and operational data similar to the first mode, while pausing the periodic monitoring of paging messages.

In some illustrative configurations, the electronic device may receive data and/or information indicative of a duration, during which the electronic device communicates with the external device using the wireless communication link and uses the external device for radio functions, and operate the electronic device radio based on the duration.

In some illustrative configurations, the electronic device may receive data and/or information indicative of a termination of wireless communication link with the external device, and operate the electronic device radio to perform a particular ramp-up sequence based on the indication of the termination of the wireless communication link.

An aspect of the disclosure provides a wireless communication device. The wireless communication device can include a first radio component operable to establish a first wireless communication link with an external device. The wireless communication device can include a second radio component operable to establish a second wireless communication link with external network equipment. The wireless communication device can include one or more processors configured to receive information indicative of a duration of the first wireless communication link, and operate the second radio component based on the received information.

An aspect of the disclosure provides a method of operating wireless circuitry in an electronic device. The method can include communicating, by the wireless circuitry, with an external device using a wireless communication link during a time period. The method can include performing, by a cellular radio of the wireless circuitry, discontinuous reception during the time period. The method can include pausing, by the cellular radio, network paging monitoring during the time period.

An aspect of the disclosure provides an electronic device. The electronic device can include a cellular radio. The electronic device can include a non-cellular radio operable to communicate with an external device using a wireless communication link. The electronic device can include one or more processors configured to receive information associated with a termination of the wireless communication link, and operate the cellular radio based on the received information.

DETAILED DESCRIPTION

Figure 1:
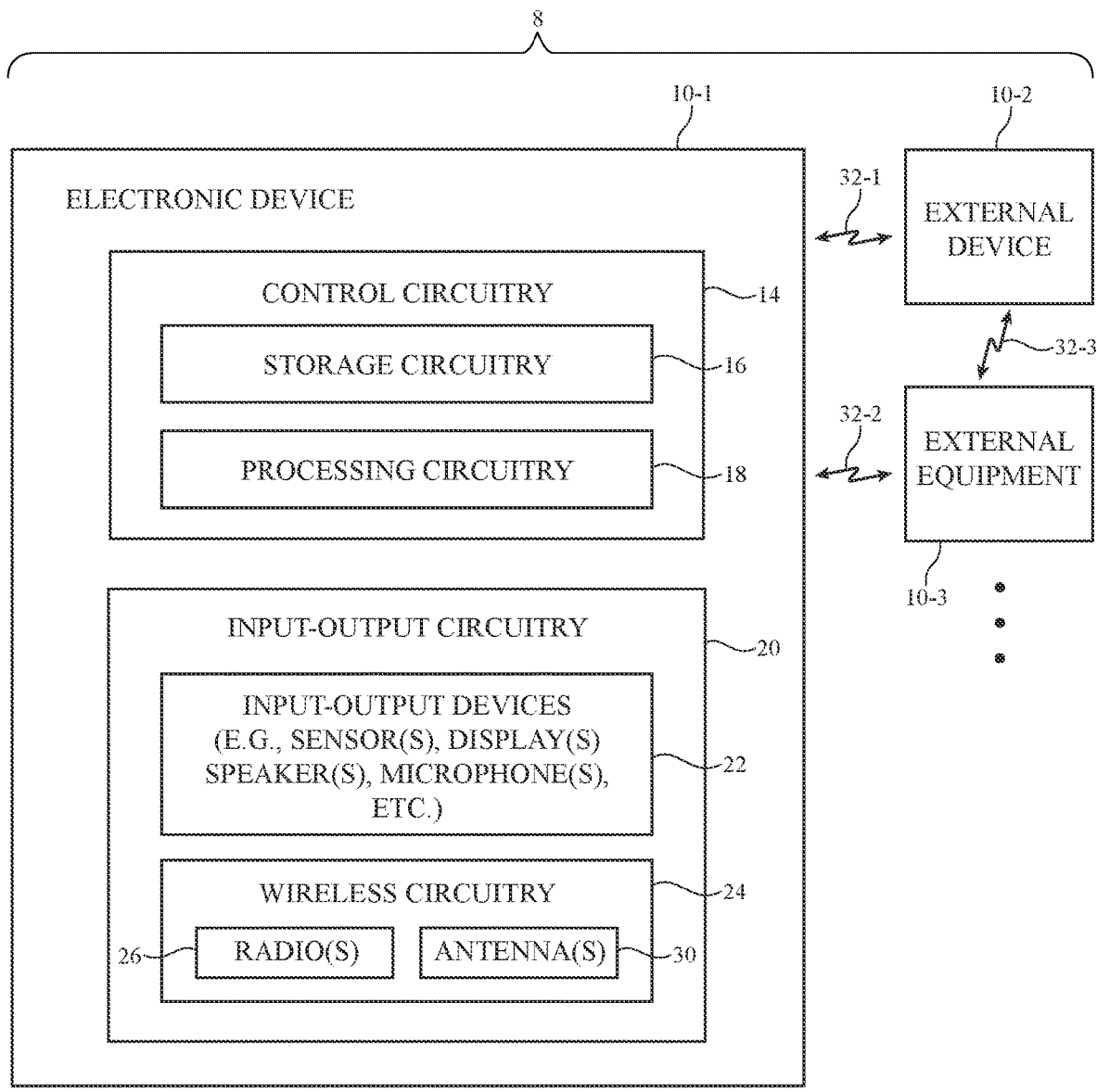
FIG. 1 is a block diagram of an illustrative system having one or more electronic devices with wireless circuitry in accordance with some embodiments.

A schematic diagram of an illustrative system such as a wireless communication system is shown in FIG. 1. As shown in FIG. 1, system 8 may include one or more electronic devices or equipment such as electronic device 10-1, device 10-2 (external to device 10-1), equipment 10-3 (external to device 10-1), and any other additional devices or equipment. Devices or equipment associated with a (cellular or mobile) network may be referred to as network equipment, while devices or equipment used by a user in conveying data to and from the network may be referred to as user equipment. System 8 may include user equipment and network equipment.

Device 10 of FIG. 1 (referring to any of device or equipment 10-1, 10-2, 10-3, or any other device or equipment in system 8) may be a wireless communication device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, one or more other network components for a radio access network, one or more other network components linking user equipment to a core network, equipment that implements the functionality of two or more of these devices, or other wireless communication equipment.

The functional block diagram of FIG. 1 shows how device 10-1 may have different functional components. Device 10-2 and equipment 10-3 may have one or more of the same functional components of device 10-1 (e.g., may have wireless circuitry such as one or more radios and one or more antennas, may have control circuitry such as one or more processors and storage circuitry, etc.), may omit one or more components of device 10-1, and/or may have additional components, if desired. These components of device 10-2 and equipment 10-3 are not shown for the sake of clarity. The operation and/or configuration of components in device 10-1 as described herein similarly support the operation and/or of the corresponding component implemented in device 10-2 or equipment 10-3.

Device 10-1 may include components located on or within a housing. The housing, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of the housing may be formed from dielectric or other low-conductivity material (e.g., glass, ceramic, plastic, sapphire, etc.). In other situations, the housing or at least some of the structures that make up the housing may be formed from metal elements.

Device 10-1 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10-1 and/or removable storage media.

Control circuitry 14 may include processing circuitry such as processing circuitry 18. Processing circuitry 18 may be used to control the operation of device 10-1. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10-1 using hardware (e.g., dedicated hardware or circuitry), firmware, and/or software. Software code for performing operations in device 10-1 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10-1 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10-1 may include input-output circuitry 20. Input-output circuitry 20 may include input-output devices 22. Input-output devices 22 may be used to allow data to be supplied to device 10-1 and to allow data to be provided from device 10-1 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors, temperature sensors, etc. In some configurations, keyboards, headphones, displays, pointing devices such as trackpads, mice, and joysticks, and other input-output devices may be coupled to device 10-1 using wired or wireless connections.

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. These components of each radio 26 may be mounted onto a respective substrate or integrated into a respective integrated circuit, chip, package (e.g., system-in-package), or system-on-chip (SOC). If desired, the components of multiple radios 26 may share a single substrate, integrated circuit, chip, package, or SOC.

Antenna(s) 30 may be formed using any desired antenna structures. For example, antenna(s) 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Wireless circuitry 24 may include any desired number of antennas 30. Some or all of the antennas 30 in wireless circuitry 24 may be arranged into one or more phased antenna arrays (e.g., for conveying radio-frequency signals over a steerable signal beam). Filter circuitry, switching circuitry, impedance matching circuitry, and/or other antenna tuning components may be adjusted to adjust the frequency response and wireless performance of antenna(s) 30 over time.

Transceiver circuitry in radios 26 may convey radio-frequency signals using one or more antennas 30 (e.g., antenna(s) 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna resonating element in the antenna by the radio-frequency signals within the frequency band(s) of operation of the antenna.

Each radio 26 may be communicatively coupled to one or more antennas 30 over one or more radio-frequency transmission lines. One or more radio-frequency transmission lines may be shared between radios 26 and/or antennas 30 if desired. Radio-frequency front end (RFFE) modules may be interposed on one or more radio-frequency transmission lines. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines.

Radios 26 may use antenna(s) 30 to transmit and/or receive radio-frequency signals within different frequency bands at radio frequencies (sometimes referred to herein as communications bands or simply as a "bands"). The frequency bands handled by radios 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired. As just one example, the radios 26 in device 10-1 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), an NFC radio for conveying NFC signals using one or more antennas 30, and a wireless charging radio for receiving wireless charging signals using one or more antennas 30 for charging a battery on device 10-1. This example is merely illustrative and, in general, radios 26 may include any desired combination of radios for covering any desired combination of RATs. If desired, antenna(s) 30 may be operated using a multiple-input and multiple-output (MIMO) scheme and/or using a carrier aggregation (CA) scheme.

Radios 26 may use antennas 30 to transmit and/or receive radio-frequency signals 32-1 and 32-2 to convey wireless communications data between device 10-1 and external wireless communications equipment such as external equipment 10-2 and 10-3 (e.g., using corresponding radios and antennas on external device 10-2 and external equipment 10-3). The wireless communications data conveyed by radios 26 may, for example, include data that has been encoded into corresponding data packets such as wireless data associated with a telephone call, streaming media content, internet browsing, wireless data associated with software applications running on device 10-1, email messages, etc.

The example of FIG. 1 is merely illustrative. While control circuitry 14 is shown separately from wireless circuitry 24 in the example of FIG. 1 for the sake of clarity, wireless circuitry 24 such as radio 26 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24 or radio 26). One or more portions (e.g., all) of each radio 26 itself may sometimes be referred to herein as a radio component such that the one or more processors may operate the one or more radio components (e.g., associated with different radios).

Figure 2:
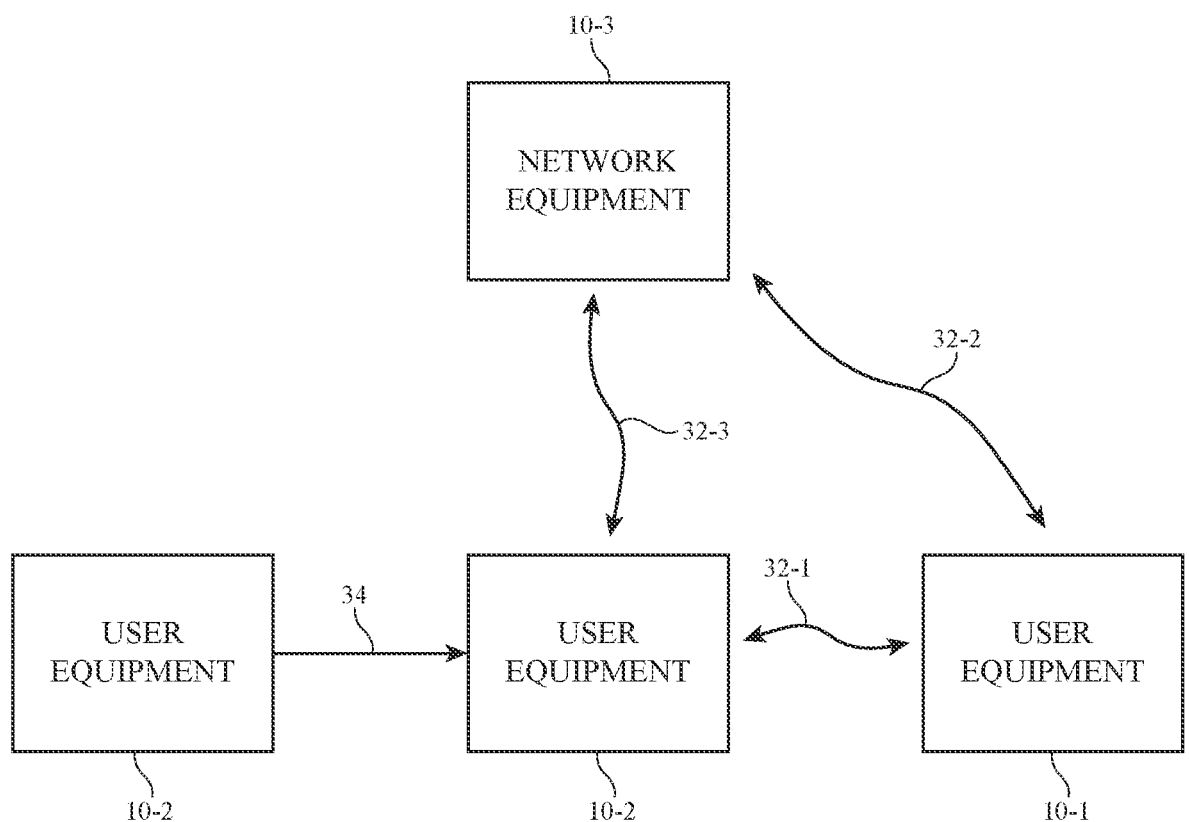
FIG. 2 is a block diagram of illustrative wireless communication links between electronic devices in accordance with some embodiments.

In one illustrative arrangement shown in FIG. 2 as an example, electronic device 10-1 may be a first portable electronic device implementing first user equipment, while electronic device 10-2 may be a second portable electronic device implementing second user equipment. User equipment 10-1 and 10-2 may both include respective wireless circuitry having radios configured to convey data to and from network equipment 10-3 using corresponding antennas.

Configurations in which user equipment 10-1 is a smaller device such as a wristwatch device, a pendant device, a headphone or earpiece device, a device embedded in eyeglasses or other equipment worn on a user's head, or other wearable or miniature device and user equipment 10-2 is a larger device such as a laptop computer, a desktop computer, a computer monitor containing an embedded computer, a tablet computer, a cellular telephone, a media player, or other handheld or portable electronic device are described herein as an illustrative example. If desired, user equipment 10-1 and 10-2 may each be implemented using any type of device.

Configurations in which network equipment 10-3 is associated with and/or implements a portion of a cellular network such as an LTE (Long Term Evolution) network or another cellular network and user equipment 10-2 and 10-3 communicate with network equipment 10-3 using cellular telephone protocols such as 4G (LTE) protocols, 5G (NR) protocols, or other cellular telephone protocols are described herein as an illustrative example. If desired, network equipment 10-3 may be associated and/or implement other networks.

In the example of FIG. 2, user equipment 10-1 may communicate with network equipment 10-3 using wireless communication link 32-2 such as a cellular communication link. In some illustrative scenarios such as where user equipment 10-1 is a smaller electronic device having a relatively small battery capacity or in other scenarios, prolonged use of a cellular radio 26 in user equipment 10-1 to establish and maintain link 32-2 with network equipment 10-3 can undesirably consume excess power. In other words, it may be desirable to minimize use of the cellular radio 26 of user equipment 10-1 where possible.

Accordingly, in a scenario where user equipment 10-2 moves (as indicated by arrow 34) from a first location to a second location in closer proximity to user equipment 10-1 (e.g., to a second location less than 1 meter, less than 5 meters, less than 10 meters, less than 15 meters, less than 30 meters, less than 50 meters, less than 100 meters, etc., away from user equipment 10-1), user equipment 10-1 may establish and maintain wireless communication link 32-1 (sometimes referred to as an external user device link, an external device link, or a companion link) with user equipment 10-2. Wireless communication link 32-1 may be a WPAN communication link such as a Bluetooth (Low Energy) communication link, or other short-range communication links (e.g., a WLAN communication link). Wireless circuitry (e.g., non-cellular radios and antennas) on user equipment 10-1 and 10-2 may communicate with each other using the corresponding protocol to form link 32-1. In this scenario, user equipment 10-1 and 10-2 may belong the same user, may be configured to be useable by the same user, may belong to related same users, etc. (as examples). If desired, equipment 10-1 may move to a position from where it is possible to establish wireless link 32-1 instead of or in addition to the movement of user equipment 10-2.

Because user equipment 10-2 may also include wireless circuitry (e.g., a cellular radio and antenna(s)) configured to establish and maintain a wireless communication link 32-3 such as a cellular communication link to communicate with network equipment 10-3, user equipment 10-1 may use link 32-3 between equipment 10-2 and 10-3 for some cellular functions of user equipment 10-1. Data associated with the cellular functions may be conveyed through link 32-1 between user equipment 10-1 and 10-2. In such a manner, data conveyed directly using cellular radio 26 in user equipment 10-1 through link 32-2 (associated with higher power consumption) may be minimized if not eliminated, and non-cellular radio 26 in user equipment 10-1 may convey data using link 32-1 for cellular and non-cellular functions (associated with lower power consumption).

While device 10-1 is communicatively coupled to device 10-2 via link 32-1 and uses the cellular radio of device 10-2 to perform cellular functions for device 10-1, cellular radio 26 in device 10-1 may be operable in a number of operation modes each having a different power consumption characteristic and a different cellular link re-establishment time. In particular, it may be desirable to reduce the power consumption of device 10-1 (e.g., of cellular radio 26 in device 10-1) while increasing the speed of re-establishing link 32-2 with equipment 10-3 when link 32-1 with device 10-2 is disrupted or terminated.

Figure 3:
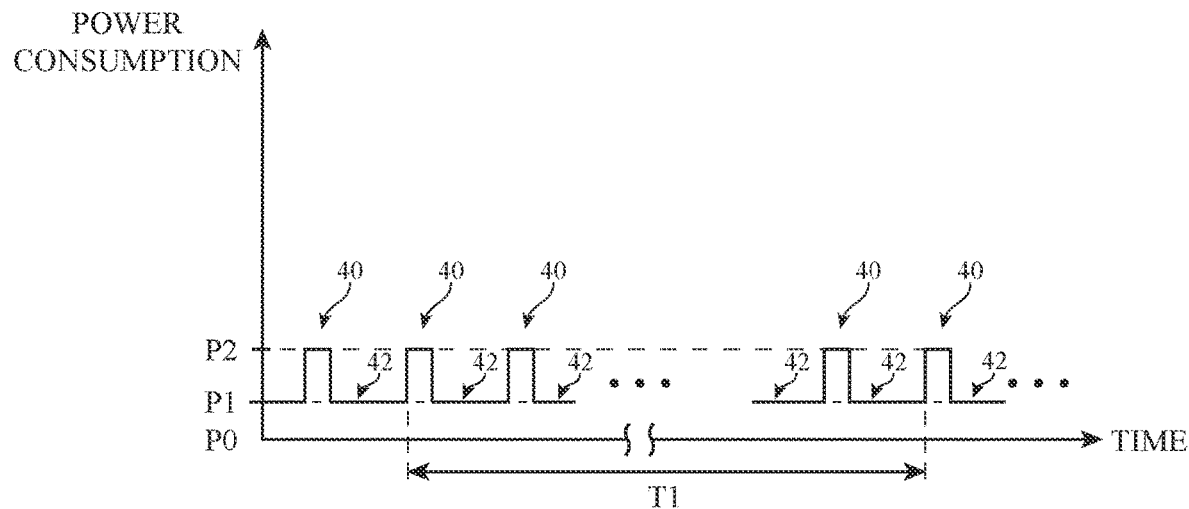
FIG. 3 is an illustrative timing diagram showing a first radio operational mode in accordance with some embodiments.

FIG. 3 is an illustrative graph showing how a (cellular) radio 26 of device 10-1 may operate in a first mode such as an idle mode (e.g., while being communicatively coupled to device 10-2 via link 32-1). As shown in FIG. 3, during time period T1 (e.g., while a non-cellular radio of device 10-1 is communicatively coupled to a corresponding non-cellular radio of device 10-2), radio 26 may operate based on a Discontinuous Reception (DRX) Cycle. During the DRX Cycle, radio 26 may enter a sleep state during each operation 42 and retain all databases and/or other data for cellular communication. Radio 26 may wake up intermittently at each operation 40 to detect and monitor for paging from the network such as paging messages sent by network equipment 10-3.

In this operational mode, (cellular) radio 26 may exhibit a level of power consumption P1 (e.g., power consumption indicated by a current draw, an amount of power used, etc.) during operation 42 and may exhibit a level of power consumption P2 during operation 40 that is higher than the level of power consumption P1. While the level of power consumption P2 is shown as being a constant level in the example of FIG. 3, this is merely illustrative. In particular, depending on the type of radio activities that take place, power consumption during each operation 40 (e.g., during each phase or time interval of operation 40) may vary. The constant level of power consumption P2 may represent an average power consumption level (for illustration) across the time period during which operation 40 occurs. If desired, each operation 40 may also exhibit a different average power consumption level unlike what is depicted in FIG. 3, where each operation 40 has the same average power consumption level P2. The embodiments described herein may be similarly applicable to any of these suitable scenarios. Radio 26, when operating in idle mode, consistently consumes power through time period T1, but is ready to re-establish cellular link 32-2 at the end of time period T1 (e.g., when the non-cellular radio of device 10-1 is communicatively decoupled from the corresponding non-cellular radio of device 10-2).

Figure 4:
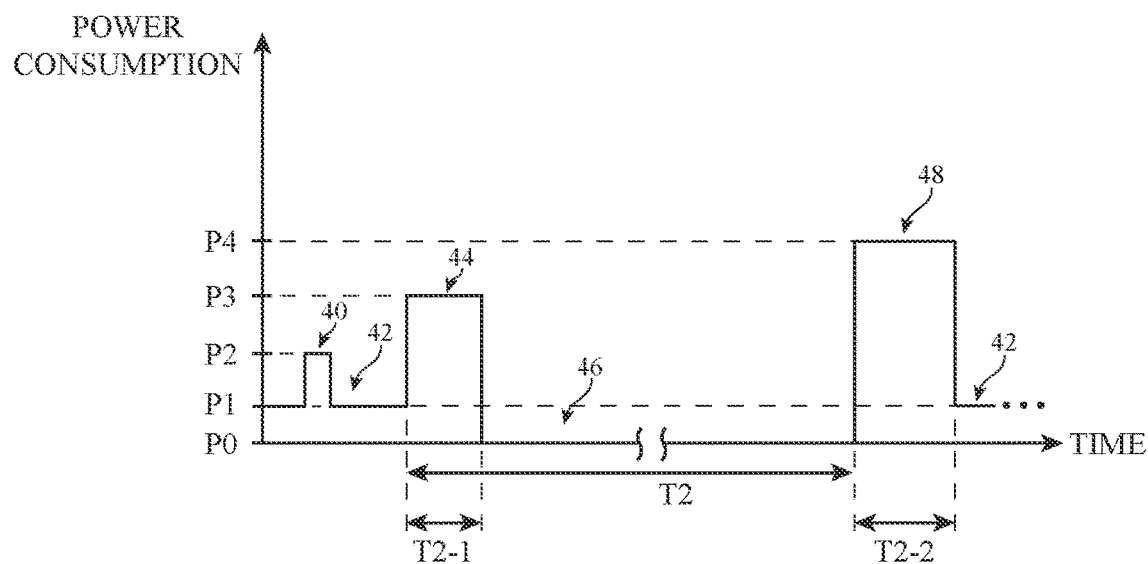
FIG. 4 is an illustrative timing diagram showing a second radio operational mode in accordance with some embodiments.

FIG. 4 is an illustrative graph showing how a (cellular) radio 26 of device 10-1 may operate in a second mode such as a radio-off mode (e.g., while being communicatively coupled to device 10-2 via link 32-1). As shown in FIG. 4, during time period T2 (e.g., while a non-cellular radio of device 10-1 is communicatively coupled to a corresponding non-cellular radio of device 10-2), radio 26 may perform a transition operation 44 during time period T2-1 within time period T2 to a radio-off operation. After performing transition operation 44 during time period T2-1, radio 26 may be in a radio-off state or operation 46 (sometimes referred to herein as operating or operation in a radio-off state or mode 46), during which radio 26 is completely off. Accordingly, while radio 26 is in radio-off operation 46, radio 26 may not store or retain data (e.g., radio operational data and data associated with cellular communication information) in its memory.

In this operational mode (cellular) radio 26 may exhibit a level of power consumption P3 during transition operation 44 and may exhibit a level of power consumption P0 during radio-off operation 46. While there may be significant power consumption during transition operation 44 (e.g., greater than the level of power consumption during operation 40 or operation 42), power consumption during radio-off operation 46 may be minimal (e.g., only associated with leakage current, less than the level of power consumption during operation 42, etc.).

After time period T2 (e.g., at the end of time period T2), (cellular) radio 26 may perform switching operation 48 during time period T2' to switch radio 26 back on (e.g., to operate using the DRX cycle in FIG. 3). Operation 48 may include a radio boot operation, an initial network/cell search operation, a synchronization/register operation, and other operations, to re-establish cellular link 32-2 with network equipment 10-3. Accordingly, radio 26 in device 10-1, when performing operation 48, may exhibit a high level of power consumption P4 (e.g., higher than during operations 40, 42, and 44). By performing (or needing to perform) operation 48, radio 26 may also introduce a delay in cellular functions for device 10-1 associated with time period T2' (e.g., the time between when the non-cellular radio of device 10-1 is communicatively decoupled from the corresponding non-cellular radio of device 10-2 and when cellular radio 26 of device 10-1 establishes link 32-2 with network equipment 10-3 at the end of time period T2').

Radio 26, when operating in the radio-off mode, may consume minimal (leakage) power while actually in the radio-off state of operation 46, but may consume high levels of power when transitioning radio 26 to the off state during operation 44 and subsequently switching radio 26 on during operation 48.

Figure 5:
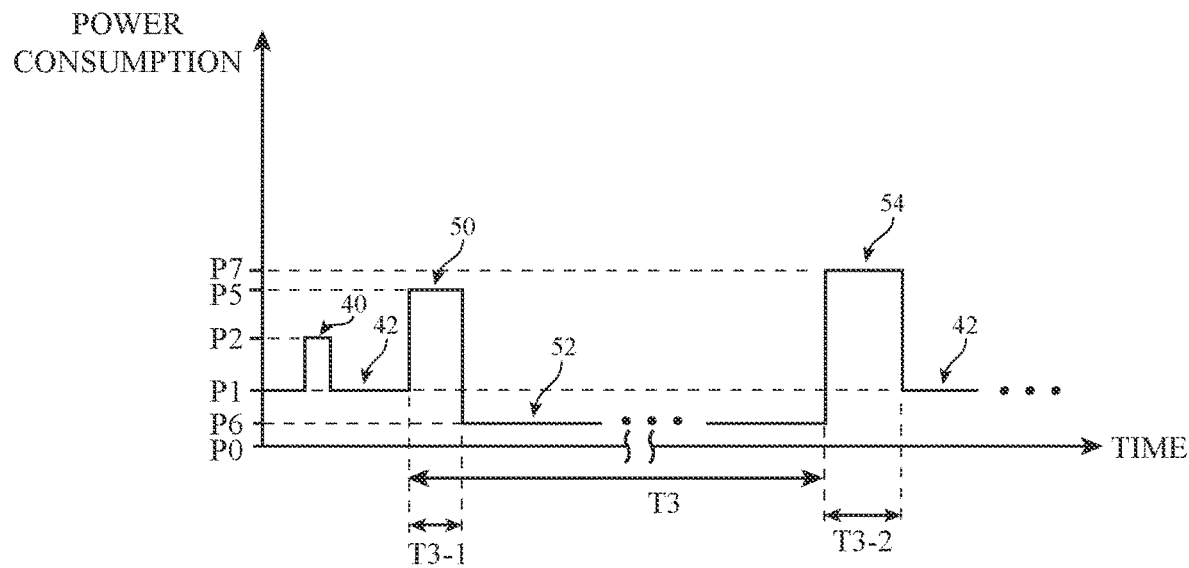
FIG. 5 is an illustrative timing diagram showing a third radio operational mode in accordance with some embodiments.

FIG. 5 is an illustrative graph showing how a (cellular) radio 26 of device 10-1 may operate in a third mode such as an airplane mode (e.g., while being communicatively coupled to device 10-2 via link 32-1). As shown in FIG. 5, during time period T3 (e.g., while a non-cellular radio of device 10-1 is communicatively coupled to a corresponding non-cellular radio of device 10-2), radio 26 may perform a transition operation 50 during time period T3-1 within time period T3 to transition into an airplane mode. After performing transition operation 50 during time period T3-1, radio 26 may be in an airplane mode of operation 52, during which radio 26 has some memory retention (e.g., basic operational data for radio 26 may be retained in the memory for radio 26, while cellular communication information may not be retained in the memory for radio 26).

In this operational mode (cellular) radio 26 may exhibit a level of power consumption P5 during transition operation 50 and may exhibit a level of power consumption P6 during the airplane mode of operation 52. While there may be significant power consumption during transition operation 50 (e.g., greater than the level of power consumption during operation 40 or operation 42), transition operation 50 to the airplane mode of operation 52 may still consume less power than transition operation 44 to radio-off operation 46 (FIG. 4). Power consumption during the airplane mode of operation 52 may be relatively low (e.g., less than the level of power consumption during operation 42). However, because radio 26 retains some operational data in memory, the power consumption (P6) during the airplane mode of operation 52 may still be greater than the power consumption (P0) when radio 26 is in radio-off operation 46 (FIG. 4).

After time period T3 (e.g., at the end of time period T3), (cellular) radio 26 may perform switching operation 54 during time period T3' to switch radio 26 back on (e.g., to operate using the DRX cycle in FIG. 3). Operation 54 may include an initial network/cell search operation, a synchronization/register operation, and other operations, to re-establish cellular link 32-2 with network equipment 10-3. Because some operational data is stored by radio 26 during the airplane mode of operation 52, unlike operation 48 (FIG. 4), the initial radio boot operation may be omitted. Accordingly, radio 26 in device 10-1, when performing operation 54, may exhibit a high level of power consumption P7 (e.g., higher than during operations 40, 42, and 50, but lower than during operation 48). By performing operation 54, radio 26 may introduce a delay in cellular functions for device 10-1 associated with time period T3' (e.g., the time between when the non-cellular radio of device 10-1 is communicatively decoupled from the corresponding non-cellular radio of device 10-2 and when cellular radio 26 of device 10-1 establishes link 32-2 with network equipment 10-3 at the end of time period T3').

Radio 26, when operating in the airplane mode, may consume less power while actually in the airplane mode operation 52, but may consume more power when transitioning radio 26 during operation 50 to the airplane mode operation 52 and subsequently switching radio 26 on during operation 54.

Figure 6:
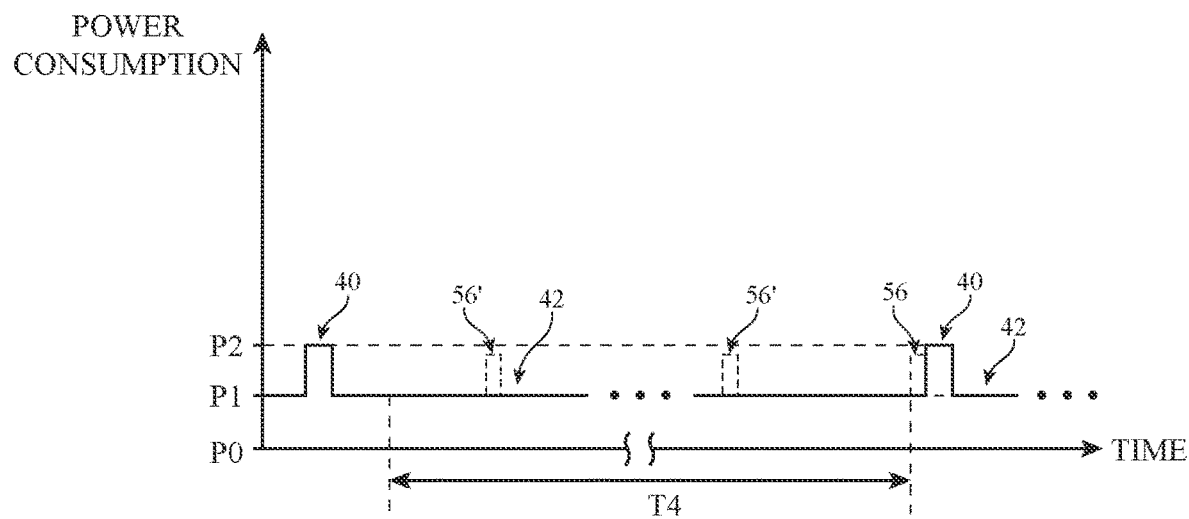
FIG. 6 is an illustrative timing diagram showing a fourth radio operational mode in accordance with some embodiments.

In order to reduce power consumption (when compared to some modes of operation) as well as minimizing the delay to switch radio 26 back on (when compared to some of the modes of operation), radio 26 may operate in a low(er)-power idle mode. This mode of operation may sometimes be referred to as an (ultra-)long DRX mode or an extended sleep mode because wake-up operations to detect paging are omitted, leaving an extended period of Discontinuous Reception. FIG. 6 is an illustrative graph showing how a (cellular) radio 26 of device 10-1 may operate in a fourth mode such as a low-power idle mode (e.g., while being communicatively coupled to device 10-2 via link 32-1). During operation in the low-power idle mode, radio 26 may operate using only a low-power clock (e.g., such as a 32 kHz clock).

As shown in FIG. 6, during time period T4 (e.g., while a non-cellular radio of device 10-1 is communicatively coupled to a corresponding non-cellular radio of device 10-2), radio 26 may perform Discontinuous Reception. In particular, similar to the idle mode of operation (FIG. 3), radio 26 may enter a sleep state during operation 42 and retain all databases and/or other data for cellular communication. However, unlike the idle mode operation (FIG. 3), radio 26 of device 10-1, when operating in the low power mode, may omit the intermittent wake ups to detect and monitor for paging from the network (operations 40 in FIG. 3).

In particular, device 10-1 may rely on and use the cellular radio of device 10-2 and its cellular link 32-3 to network equipment 10-3 to detect and monitor for paging from the network (e.g., paging messages from network equipment 10-3). These paging messages and/or paging information may, if applicable to device 10-1, be conveyed between device 10-2 and device 10-1 via non-cellular link 32-1. As shown in FIG. 6, prior to period T4 and after period T4, cellular radio may perform paging monitoring operations 40, while during time period T4, paging monitoring may be paused (e.g., omitted from time period T4).

In this operational mode, (cellular) radio 26 may exhibit a level of power consumption P1 during operation 42 for the majority of the time in time period T4 (and may omit the periodic power consumption P2 associated with operation 40 in FIG. 3). Radio 26, when operating in low-power idle mode through time period T4, may thereby consume power at a slower rate than when operating in idle mode through time period T1 (FIG. 3). Additionally, at the end of time period T4 (e.g., when the non-cellular radio of device 10-1 is communicatively decoupled from the corresponding non-cellular radio of device 10-2), radio 26 may only need to perform a (timing and frequency) resynchronization operation 56 to the cell to re-establish cellular link 32-2 with network equipment 10-3. Radio 26, when operating in low-power idle mode through time period T4, may thereby cause a shorter delay when re-establishing cellular link 32-2 when compared to operating in a radio-off mode through time period T2 (FIG. 4) and when compared to operating in an airplane mode during time period T3 (FIG. 5). In other words, the duration of operation 56 may be shorter than the duration of operation 48 and shorter than the duration of operation 54.

To ensure a short duration for switching radio 26 on (e.g., a short duration of operation 56), radio 26 in device 10-1 may perform intermittent operations 56' with different types of operations and with a periodicity based on a mobility state of device 10-1 to maintain synchronization in timing and frequency to the cell. In other words, one or more operations 56' may be interspersed within operation 42 during time period T4 depending on how much device 10-1 is moving.

As a first example, if device 10-1 is in a low mobility state (e.g., not moving or moving within a relatively small area), radio 26 may omit intermittent operations 56' because radio 26 may perform resynchronization operation 56 to cell at the end of time period T4 to re-establish link 32-2 with network equipment 10-3 (e.g., to operate using the DRX cycle in FIG. 3) in a sufficiently short amount of time (e.g., shorter than time period T2' and T3'). As a second example, if device 10-1 is in a medium mobility state, radio 26 may perform intermittent operations 56' such as intermittent resynchronization operations to the cell with sufficient periodicity (e.g., once every minute) to ensure that cell timing and frequency are not lost completely by radio 26. This consequently helps to ensure that radio 26 does not need to perform a cell search operation at the end of time period T4, and only needs to perform a resynchronization operation 56 to the cell to re-establish cellular link 32-2 with network equipment 10-3. As a third example, if device 10-3 is in a high mobility state, radio 26 may perform intermittent operations 56' such as cell reconfirmation operations with a relatively frequency periodicity (e.g., during each paging cycle, as frequent as operations 40 in FIG. 3, etc.). However, radio 26 performing (reconfirmation) operations 56' with the paging cycle periodicity may still not need to handle (e.g., decode) network paging messages (e.g., still does not perform operation 40 in FIG. 3).

In the examples of FIGS. 3-7, power consumption levels for some active operations of radio 26 are depicted to have a constant power consumption profile during the entirety of that operational time period. However, this is merely illustrative. Each of power consumption levels P2-P5 and P7 (and perhaps to a certain extent, power consumption levels during non-operational states of radio 26 such as P0, P1, and P6) may fluctuate during its corresponding operation or non-operation time period (e.g., during each phase or time interval of operation). Even the same type of operation (e.g., operations 40 in FIG. 3, operations 56 or 56' in FIG. 6, etc.) taking place periodically may exhibit power consumption profiles that are non-constant and that average to a different power consumption level. The embodiments described herein may similarly be applicable to any of these scenarios (e.g., in a practical scenario where power consumption levels are not constant during the corresponding radio operation or non-operation).

Figure 7:
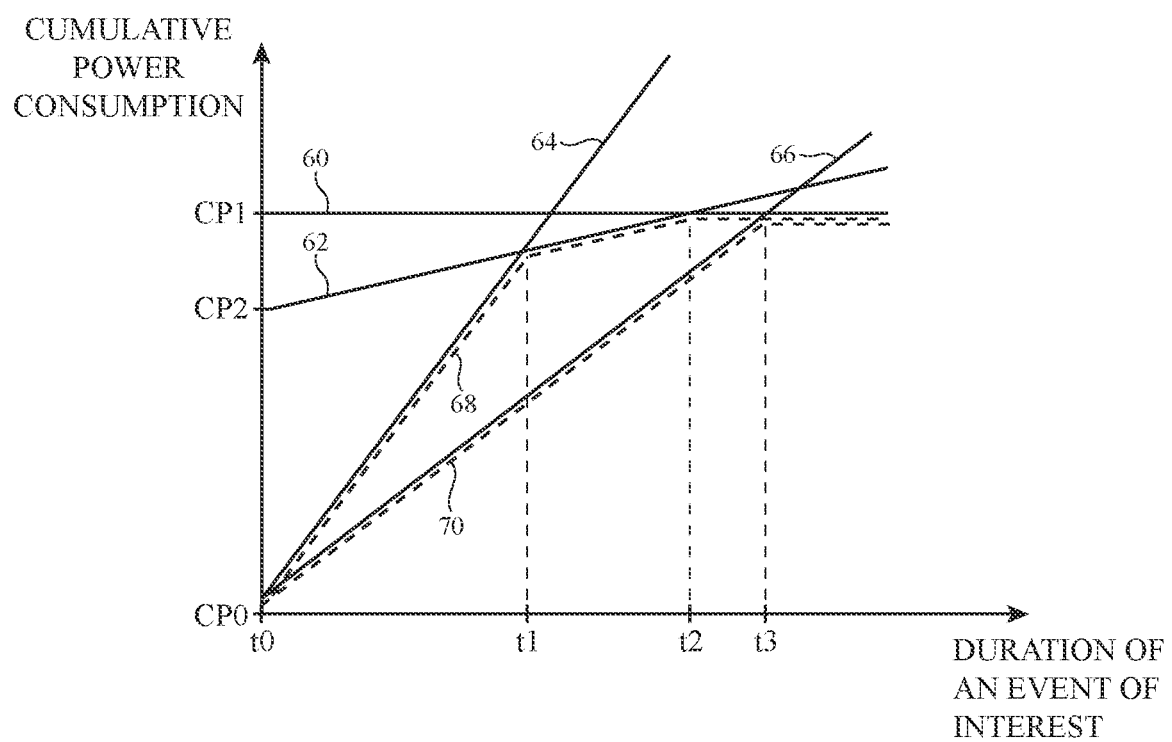
FIG. 7 is a graph showing illustrative cumulative radio power consumption characteristics across different operational modes in accordance with some embodiments.

FIG. 7 is an illustrative graph showing varying cumulative power consumption characteristics of (cellular) radio 26 in device 10-1 operating in the different radio operational modes as described in connection with FIGS. 3-6 for an event of interest. Configuration in which the event of interest relates to device 10-2 being present and/or in close proximity to device 10-1 and/or a (non-cellular) link 32-1 is established and maintained between devices 10-1 and 10-2 are described herein as an illustrative example. If desired, the cumulative power consumption characteristics in FIG. 7 may describe radio operations relative to other events of interest.

As shown in FIG. 7, cumulative power consumption (e.g., current drawn, power used, etc.) is plotted against the duration of the event such as the (expected) duration that link 32-1 is maintained between device 10-1 and 10-2. Lines 60, 62, 64, and 66 may each represent a different radio operational mode. Each line may have vertical intercept, a cumulative power consumption value at a theorical duration value t0 associated with a duration of the event where the fixed power consumption operations of each mode is performed. Each line may have a slope that represents a variable power consumption component of the cumulative power consumption that increases proportionally with the duration of the event.

In the example of FIG. 7, line 60 may represent radio operation in the radio-off mode during time period T2 and including time period T2' (FIG. 4). Because operations 44 and 48 occur regardless of the duration of time period T2 and power consumption does not increase substantially with increased duration of time period T2 (radio-off state 46 has minimal leakage power consumption), operation in the radio-off mode is associated with a high fixed power consumption component and a low variable power consumption component. Hence, line 60 has a high vertical intercept (at value CP1) and a small (positive) slope, and has a cumulative power consumption value of around value CP1 at any duration of the event.

Line 62 may represent radio operation in the airplane mode during time period T3 and including time period T3' (FIG. 5). Because operations 50 and 54 occur regardless of the duration of time period T3, operations 50 and 54 define the fixed power consumption component, thereby causing line 62 to exhibit a vertical intercept at value CP2. Power consumption associated with operation 52 may scale with the duration of the event (e.g., the duration of time period T3), thereby causing line 62 to exhibit its (positive) slope, that is greater than the slope of line 60.

Line 64 may represent radio operation in the idle mode during time period T1 (FIG. 3). Because operations 40 and 42 occur cyclically through time period T1, this is no fixed power consumption component, thereby causing line 64 to exhibit a vertical intercept at value CP0 (e.g., at no initial power consumption). Because perform cyclical operations 40 and 42 continuously requires ever-increasing substantial amounts of power, line 64 may exhibit a steep or large (positive) slope, which may be greater than the slope of lines 60, 62, and 66.

Line 66 may represent radio operation in the low-power idle mode during time period T4 and include operation 56 (FIG. 6) in a scenario with no or minimal intermittent operations 56', as a simpler illustrative example. Because operation 56 occurs regardless of the duration of time period T4, operation 56 may define the fixed power consumption component, thereby causing line 66 to exhibit a vertical intercept slightly above value CP0 in the example that power consumption of operation 56 is small. Because operation 42 occurs continuously through time period T4, operation 42 may define the variable power consumption component, thereby causing line 66 to exhibit its slope, which may be less than the slope of line 64 but greater than the slopes of lines 60 and 62.

As shown in FIG. 7, no single radio operating mode has an optimal (lowest) cumulative power consumption across all durations of the event. In other words, depending on how long the event lasts (e.g., link 32-1 between devices 10-1 and 10-2 is maintained), different operational modes are optimal. Consider an example, in which radio 26 is operable in a radio-off mode (line 60), in an airplane mode (line 62), and in an idle mode (line 64), and not in a low-power idle mode (line 70). In this example, radio 26 may operate optimally (e.g., considering power consumption) by operating in the idle mode (line 64) if the duration of the event is between duration t0 and duration t1, by operating in the airplane mode (line 62) if the duration of the event is between duration t1 and duration t2, and by operating in the radio-off mode (line 60) if the duration of the event is greater than duration t2. Dashed line 68 may represent the different optimal portions of the operational modes based on event duration in this example.

Consider another example, in which radio 26 is operable in a radio-off mode (line 60), in an airplane mode (line 62), in an idle mode (line 64), and in a low-power idle mode (line 66). In this example, radio 26 may operate optimally (e.g., considering power consumption) by operating in the low-power idle mode (line 66) if the duration of the event is less than duration t3, and by operating in the radio-off mode (line 60) if the duration of the event is greater than duration t3. Dashed line 70 may represent the different optimal portions of the operational modes based on event duration in this example. As a note, there may be a small set of durations close to duration t0 (before line 64 crosses line 66) where it may be actually optimal to operate in the idle mode (line 64).

These examples described in connection with FIGS. 3-7 are illustrative of one or more features, configurations, principles, and characteristics associated with these radio operational modes. If desired, a radio when operating in one or more of these modes may exhibit different behavior.

Figure 8:
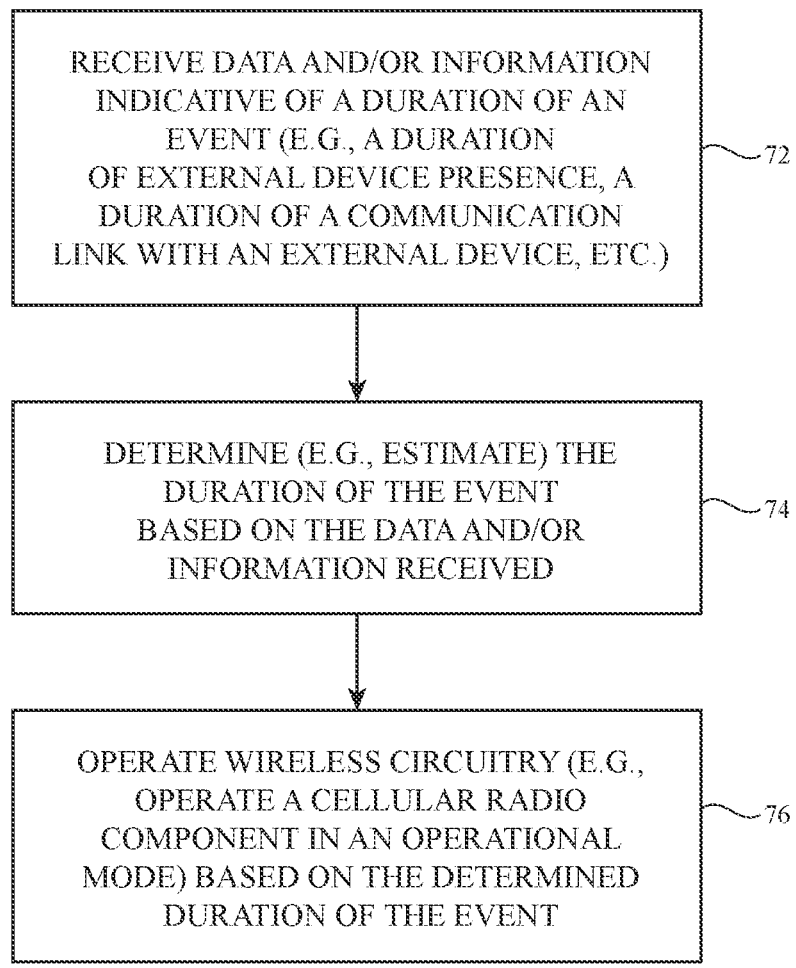
FIG. 8 is a flowchart of illustrative operations for operating wireless circuitry in an operational mode based on a presence of an external device in accordance with some embodiments.

As described in connection with FIG. 7, different radio operational modes (e.g., for operation cellular radio 26 in device 10-1) may be optimal for different event durations. FIG. 8 is a flow chart of illustrative operations for operating wireless circuitry based on a duration of an event. One or more (e.g., all) operations in FIG. 8 may be performed by one or more processors implementing portions of wireless circuitry 24 such as one or more radios 26, implementing portions of processing circuitry 16, and/or implementing portions of other components in device 10-1. The one or more operations in FIG. 8 may be stored as software instructions on storage circuitry (e.g., a non-transitory computer-readable storage medium) associated with the one or more processors and executable by the one or more processors to perform the one or more operations in FIG. 8.

As shown in FIG. 8, at operation 72, the one or more processors may receive information indicative of a duration of an event such as a duration of external device presence or more directly a duration of a communication link with the external device (e.g., a duration of non-cellular communication link 32-1 with device 10-2), or a duration of another event of interest.

As an example, the received information may include data requested by the one or more processors from one or more components in device 10-1 and may include data stored at storage circuitry in device 10-1 associated with operation of device 10-1. In particular, the one or more processors may request for and receive data generated by one or more sensors in input-output devices 22 (FIG. 1) such as motion sensors or data generated by wireless circuitry 24 such as GPS data or other location-based data indicative of the location of device 10-1 and/or the user. The one or more processors may receive stored general user statistics information such as information relating to the type of user, or the usage of devices of the same type as device 10-1 across a population of users (e.g., an average duration of link 32-1 across a population of users). The one or more processors may also receive metadata such as a time of day, user calendar entries, applications being actively used, current and/or historical information relating to the usage of device 10-1 by the user, etc. If desired, any suitable information for device 10-1, the operation of device 10-1, the user, and/or other relevant metadata may be received during operation 72 by the one or more processors.

In some scenarios (e.g., where the requested and received (internal) information regarding device 10-1 is insufficient to indicate and/or suggest a duration of the event), at operation 72, the one or more processors may request for and receive data from device 10-2 (e.g., using link 32-1). The requested and receive data may include data generated by one or more sensors in input-output devices in device 10-2 such as motion sensors or data generated by wireless circuitry in device 10-2 such as GPS data or other location-based data indicative of the location of device 10-2 and/or the user. In general, any suitable information associated with device 10-2, the operation of device 10-2, the user, and/or other relevant metadata may also be received during operation 72 by the one or more processors.

In some scenarios (e.g., where the requested and received (internal) information associated with device 10-1 and the requested and received information associated with device 10-2 are insufficient to indicate and/or suggest a duration of the event), at operation 72, the one or more processors may request for and receive data from additional devices (e.g., one or more electronic devices 10 in system 8 of FIG. 1). If desired, one or more devices 10 in system 8 may share information with each other indicative of an event duration and/or an end of the event. The shared information may be relayed to device 10-1 via device 10-2 to inform the one or more processors to switch operational modes of cellular radio 26 and/or other wireless circuitry (e.g., change the conveyance of data via a non-cellular radio).

Figure 9:
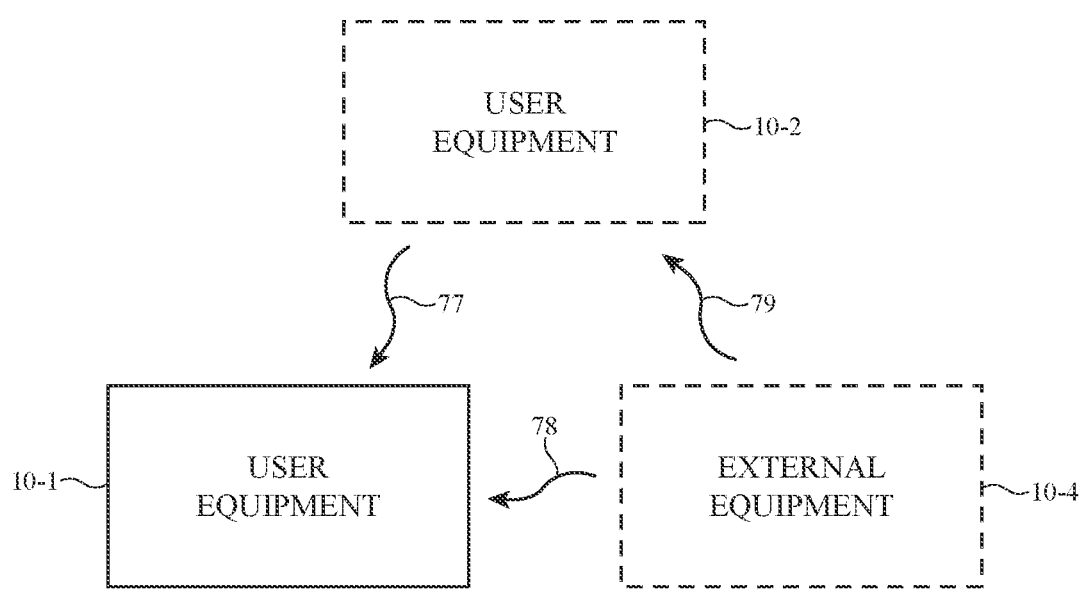
FIG. 9 is a block diagram of illustrative electronic devices communicatively coupled to one another to share information in accordance with some embodiments.

Referring to FIG. 9 as an illustrative example, device 10-1 may be communicatively coupled to device 10-2 and device 10-4 (e.g., another instance of device 10 in system 8 of FIG. 1, sharing one or more of the same components described for device 10-1 in FIG. 1). While in FIG. 9, devices 10-1 and 10-2 are referred to as user equipment (e.g., having cellular capabilities), this is merely illustrative. If desired, devices 10-1 and 10-2 may each have any suitable capabilities or omit any suitable capabilities. Additionally, device 10-4 may be any suitable device or equipment (e.g., not necessarily a user device or user equipment having cellular capabilities).

In some illustrative configurations described herein as examples, devices 10-1 may be a smaller device such as a wristwatch device, a pendant device, a headphone or earpiece device, a device embedded in eyeglasses or other equipment worn on a user's head, or other wearable or miniature device, device 10-2 may be a larger device such as a tablet computer, a cellular telephone, a media player, or other handheld or portable electronic, and external equipment 10-4 may be a device without cellular capabilities such as a laptop computer, a desktop computer, a computer monitor containing an embedded computer, a wireless internet-connected voice-controlled speaker, a home entertainment device, a wireless (e.g., Wi-Fi) access point or any other suitable device or equipment. In general, devices 10-1, 10-2, and 10-4 may be implemented in any suitable manner.

In connection with operation 72 in FIG. 8, device 10-1 may first gather (e.g., one or more processors in device 10-1 may receive) information indicative of a duration of external device presence or more directly a duration of a communication link with the external device internally by using internal sensors, using internally stored information, or generally using internal components. In response to insufficient information being received by the one or more processors in device 10-1 or any other suitable condition, the one or more processors in device 10-1 may request and receive information generated by one or more other devices such as devices 10-2 and 10-4 (e.g., generated by corresponding sensors or stored in the other devices) via communication links 77 and 78. If desired, information from other devices may be requested and receive sequentially. For example, in response to insufficient information being received by the one or more processors in device 10-1 from internal components and device 10-2, the one or more processors in device 10-1 may request and receive information generated by device 10-4; in response to insufficient information being received by the one or more processors in device 10-1 from internal components, device 10-2, and device 10-4, the one or more processors in device 10-1 may request and receive information generated by another device, and so on. If desired, device 10-4 may convey information to device 10-1 through intervening device 10-2 (e.g., through communication links 79 and 77, instead of through communications link 78).

Referring back to FIG. 8, at operation 74, the one or more processors may determine (e.g., estimate) the duration of the event based on the received data and/or information. In particular, the one or more processors may determine the most likely duration of link 32-1, may determine multiple likely durations of link 32-1 based on the received data and/or information, may determine a range of likely durations, and/or may generally determine link duration information (e.g., one or more characteristics of the link duration).

As a first example, the one or more processors may determine a duration based on using a known wireless access point or geofencing. In particular, devices 10-1 and/or 10-2 may typically be connected to the wireless access point and/or be within the geofence for a duration, which may be the same as or indicative of the duration of link 32-1.

As a second example, the one or more processors may determine a duration based on using metadata and other information to determine the use case of devices 10-1 and 10-2. In particular, based on a time of day being late in the evening, it is likely that the duration of link 32-1 may be long, especially after determining based on location data that the location of devices 10-1 and 10-2 are at a home location.

These examples are merely illustrative. If desired, other use cases and/or scenarios of operating devices 10-1 and 10-2 may be determined, and accordingly, based on the use cases and/or scenarios, one or more likely durations of link 32-1 may be determined.

At operation 76, the one or more processors may operate wireless circuitry 24 (e.g., one or more radios 26 such as a cellular radio or a cellular radio component) in an operational mode based on the determined duration of the event. In particular, the one or more processors may select one of the operational modes described in connection with FIGS. 3-7 for cellular radio 26 (e.g., a cellular radio component in radio 26) based on the determined duration.

As an example, the one or more processors may operate cellular radio 26 based on dashed line 70 or based on dashed line 68 in FIG. 7 (in scenarios where cellular radio 26 does not operation in low-power mode). In particular, the one or more processors may operate cellular radio 26 in an idle mode (or in a low-power idle mode, if possible) based on the determined duration being between duration of t0 and t1 (FIG. 7). The one or more processors may operate cellular radio 26 in an airplane mode (or in a low-power idle mode, if possible) based on the determined duration being between duration of t1 and t2 (FIG. 7). The one or more processors may operate cellular radio 26 in a radio-off mode (or in a low-power idle mode, if possible) based on the determined duration being between duration t2 and t3 (FIG. 7). The one or more processors may operation cellular radio 26 in a radio-off mode based on the determined duration being greater than duration t3 (FIG. 7).

In the scenario where multiple likely durations of link 32-1 (e.g., a short duration and a long duration) exist, the one or more processors may operate cellular radio 26 in an optimal mode for the short duration (e.g., an idle mode) and after the short duration has passed, may operate radio 26 in an optimal mode for the long duration (e.g., a radio-off mode).

In the example of radio 26 operating in the low-power idle mode, the one or more processors may also gather mobility data of device 10-1 (e.g., using motion sensors, GPS, etc.) at operation 72 and other suitable information. At operation 76, the one or more processors when operating radio 26 in the low-power idle mode may adjust the power consumption of the low-power idle mode (e.g., adjust the periodicity and duration of operations 56' in FIG. 6) based on the mobility data.

If desired, the one or more processors may perform operations 72, 74, and 76 periodically, based on a trigger (e.g., a trigger event), or at any suitable time. The one or more processors performing operations 72, 74, and 76 may help refine or update the determined duration (e.g., in scenarios where the use case or other information has changed). Accordingly, the one or more processors may update the operational mode of radio 26 if applicable.

As an illustrative example, one or more devices 10 in system 8 (FIG. 1) external to device 10-1 and device 10-2 (e.g., an accessory device to devices 10-1 and 10-2 such as a set of earbuds, a headset, a head-mounted display device, a wearable device, etc.), may be configured to provide a trigger signal to device 10-1 (e.g., directly to device 10-1 or through device 10-2 such that device 10-2 may also provide information to device 10-1 as described in connection with operation 72 in FIG. 8). The trigger signal may be provided to device 10-1 based on detecting a degradation of a communication link with device 10-2 (indicative of device 10-2 moving away from the accessory device and device 10-1 or indicative of a possibility that the communication link between devices 10-1 and 10-2 may degrade soon also) and/or based on other information. In this manner, any suitable electronic device in system 8 may share its link quality information with other devices in system 8 to assist the other devices in making any adaptive changes as appropriate.

If desired, in response to the trigger signal, devices 10-1 and 10-2 may check the quality of the communication link with each other, may make a decision regarding a handover operation, perform the handover operation, and/or configure devices 10-1 and 10-2 in a suitable manner (e.g., configure a cellular radio in device 10-1 to operate in a power-on mode, operate a non-cellular radio in device 10-1 to establish a new connection, perform operations 72, 74, and 76 in FIG. 8 using device 10-1, etc.). In particular, with respect to the handover operation, the accessory device in system 8 may establish a new communication link with device 10-1 and remove (replace) the existing communication link with device 10-2 if, in response to the trigger signal, the handover operation is performed. In additional to switching the communication links between these three devices, content (e.g., data) that originally was provided by device 10-2 to the accessory device can also be switched to be provided by device 10-1. In other words, in arrangements where device 10-2 was gathering the content to be provided to the accessory device, device 10-1 can now gather the content to be provided to the accessory device (e.g., through a newly established cellular link given that device 10-2 may also no longer be communicatively coupled to device 10-1).

While in connection with FIGS. 3-8, radio operations are sometimes described in the context of selecting or entering an optimal (e.g., minimal power consumption) operational mode during the event based on the expected event duration, radio operations in anticipation of an ending of the event may also be optimized (e.g., to reduce power consumption, to reduce delays in operation, etc.).

Figure 10:
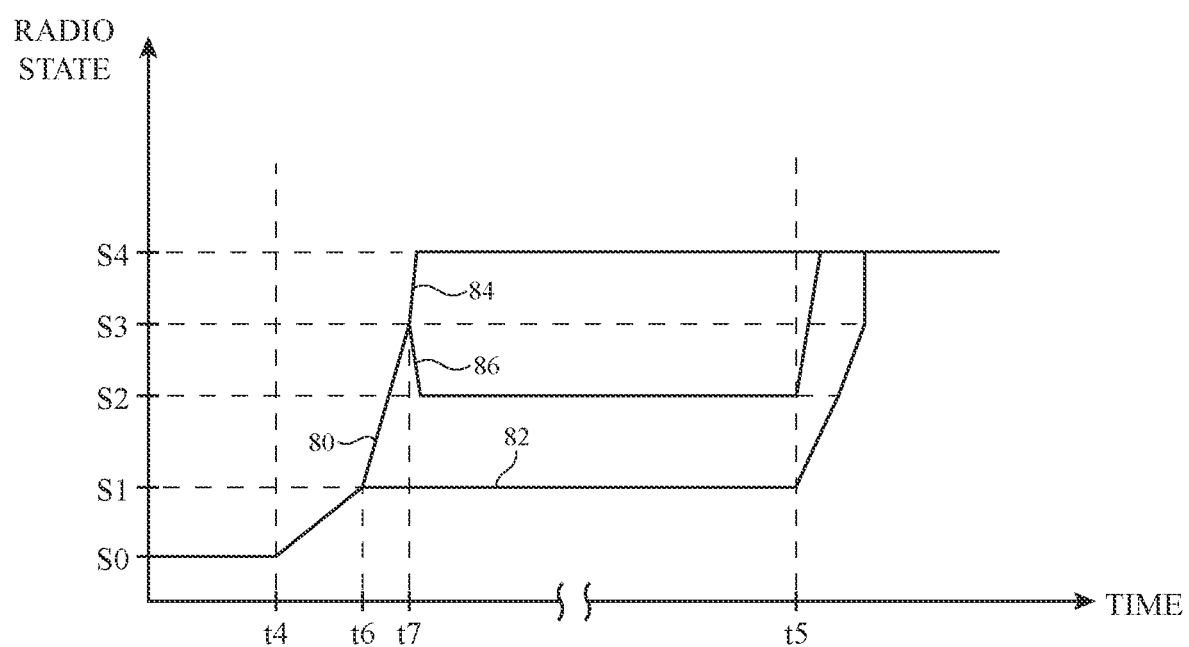
FIG. 10 is a graph showing illustrative radio states and corresponding ramp-up sequence options in accordance with some embodiments.

FIG. 10 is an illustrative graph showing cellular radio 26 in device 10-1 ramping-up operations from a radio-off state to an idle state. As shown in FIG. 10, state S0 may represent a radio state when radio 26 is off (e.g., during operation 46 in FIG. 4), while state S4 may represent a state when radio 26 has established a cellular link 32-2 with network equipment 10-3, is performing discontinuous reception, and as such, is in an idle state (e.g., during operations 40 and 42 in FIG. 3).

In particular, radio 26 may perform different ramp-up sequences by passing through different radio states (e.g., states S1, S2, and S3) with different timings to go from radio-off state S0 to idle state S4. State S1 may, as an example, represent a booted state or an airplane mode state (e.g., during operation 52 in FIG. 5), during which radio 26 has operational configurations loaded and is ready to synchronize and register with the network (e.g., network equipment 10-3). State S2 may, as an example, represent a low-power idle state (during operation 42 in FIG. 6). State S3 may, as an example, represent a state in which radio 26 is synchronized and registered with the network (e.g., network equipment 10-3) and is configured to perform (DRX) operations in the idle state, if desired.

Depending on the operational state of cellular radio 26 (while non-cellular link 32-1 with device 10-2 is active), cellular radio 26 start the ramp-up or wake-up process from a state that is not radio-off state S0 (e.g., from an airplane mode state, from a low-power idle state, etc.). In the example of FIG. 10, different operations starting from radio-off state S0 are described for completeness. If desired, radio 26 may perform only the applicable operations depending on the starting state.

As shown in FIG. 10, at time t4, radio 26 may receive a trigger such as a control signal for initiating the ramp-up sequence (e.g., a trigger indicating that non-cellular link 32-1 between devices 10-1 and 10-2 will soon be terminated). Thereafter, radio 26 may perform a boot (up) operation to be in booted (airplane) state S1 at time t6.

In a first illustrative scenario, upon being booted up, radio 26 may immediately perform synchronization and registration operations with the network (e.g., network equipment 10-3) to ramp directly up to the idle state as indicated by paths 80 and 84, and remain in the idle state to perform DRX operations (including paging detection). This approach may be optimal if non-cellular link 32-1 is terminated (as an example) shortly after time t7 as delay in cellular functions by radio 26 may be minimized (because radio 26 is already fully synchronized and operating in the DRX cycle). However, depending on how far in advance the trigger is relative to the actual termination of non-cellular link 32-1, radio 26 may be in the idle state for a prolonged period of time, thereby consuming excess power while performing DRX cycles.

In a second illustrative scenario, after being booted up and performing synchronization and registration operations (as indicated by path 80), radio 26 may configured to perform operations in the idle state (e.g., in a fully synchronized state), but may not do so in favor of dropping back (as indicated by path 86) to a lower power state such as low-power idle state S2 (e.g., performing operation 42 in FIG. 6) or booted (airplane) state S1. This allows radio 26 to reduce power consumption while link 32-1 is still active. In the event that link 32-1 is terminated (e.g., at time t5 or shortly after time t5 if another trigger indicating imminent termination is received at time t5), radio 26 may only exhibit a short delay after time t5 before reaching idle state S4 by performing a short resynchronization operation with the network (e.g., operation 56 in FIG. 6). It may be desirable for radio 26 to perform this ramp-up sequence if synchronization and registration operations take a longer amount of time (e.g., due to device location change, due to a longer length of time since last synchronization, etc.) because with this ramp-up sequence, synchronization and registration operations can be done ahead of time (e.g., before time t5).

In a third illustrative scenario, after booting up, radio 26 may remain in booted (airplane) state S1 until link 32-1 is terminated (e.g., from time t6 to time t5). At time t5, after link 32-1 is terminated, radio may perform synchronization and registration operations and ramp up to operation in idle state S4. While using this ramp-up sequence, radio 26 may exhibit a longer delay after time t5 than in the second scenario, less power is consumed between time t6 to t6 than in the second scenario. In order to minimize the delay after time t5, it may be desirable for radio 26 to perform this ramp-up sequence if synchronization and registration operations take a shorter amount of time (e.g., due to location, cell, and/or frequency has not changed, due to a shorter length of time since last synchronization, etc.). Additionally, it may also be desirable for radio 26 to perform this ramp-up sequence when the duration between time t4 and time t5 is uncertain since radio 26 may operate at least with reduced power consumption.

These scenarios are merely illustrative. If desired, radio 26 may operate using other ramp-up sequences.

Figure 11:
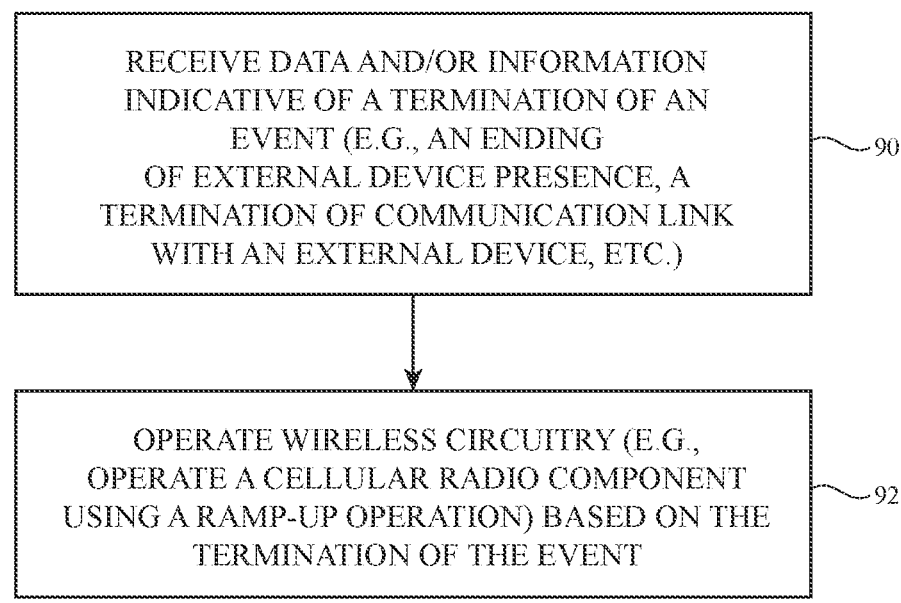
FIG. 11 is a flowchart of illustrative operations for operating wireless circuitry using a ramp-up sequence based on a presence of an external device in accordance with some embodiments.

As described in connection with FIG. 10, the duration between a trigger indicative of the termination of an event (e.g., termination of non-cellular link 32-1) and the actual termination of the event may indicate to radio 26 the particular ramp-up sequence to be used. FIG. 11 is a flow chart of illustrative operations for operating wireless circuitry based on a termination of an event (e.g., a duration to the termination of the event). One or more (e.g., all) operations in FIG. 11 may be performed by one or more processors implementing portions of wireless circuitry 24 such as one or more radios 26, implementing portions of processing circuitry 16, and/or implementing portions of other components in device 10-1. The one or more operations in FIG. 11 may be stored as software instructions on storage circuitry (e.g., a non-transitory computer-readable storage medium) associated with the one or more processors and executable by the one or more processors to perform the one or more operations in FIG. 11.

As shown in FIG. 11, at operation 90, the one or more processors may receive data and/or information indicative of an ending of an event such as a termination of a communication link with an external device (e.g., a termination of non-cellular communication link 32-1 with device 10-2), or an ending of another event of interest. In particular, the one or more processors may receive any of same data described in connection with operation 72 such as data associated with the user, data associated with device 10-1, data associated with device 10-2, data associated with other devices (e.g., in system 8 of FIG. 1), and metadata.

As an illustrative example, the one or more processors may receive link quality data (e.g., Received Signal Strength Indicator data) associated with link 32-1. Based on a degradation (e.g., a rate of degradation or a degree of degradation) of link quality for link 32-1, the one or more processors may anticipate a termination or ending of link 32-1.

In other examples, the received information may be indicative of a termination of link 32-1 in advance of the degradation of link quality. Receiving this type of information provides advance notice to the one or more processors to begin operating cellular radio 26 (e.g., one or more cellular radio components in radio 26) using a given ramp-up sequence to potentially minimize disruption of cellular functions after link 32-1 terminates.

Additionally, anticipating the termination of link 32-1 before link 32-1 terminates, allows device 10-1 to use link 32-1 (and device 10-2) to request and receive information that assists with the ramp-up operation of device 10-1. As examples, the one or more processors may receive, via link 32-1 and device 10-2, one or more (current) cell frequencies, one or more cell ID(s), scrambling code(s), timing offset(s), and/or other assisting information. If desired, the duration of link 32-1 may also be received by the one or more processors and may be indicative of whether historical device information (e.g., device location) is accurate. If desired, the one or more processors may also receive more precise frequency and/or frequency offset information useable by cellular radio 26 to perform frequency search and synchronization more quickly.

At operation 92, the one or more processors may operate wireless circuitry 24 (e.g., one or more radios 26 such as a cellular radio or a cellular radio component) using a ramp-up operation or sequence (in FIG. 10) based on the ending of the event (e.g., based on a duration to the termination of link 32-1).

As an example, in a scenario where a user routinely carries device 10-1 away from device 10-2 (e.g., terminating link 32-1) on certain days of the week at a certain time, the one or more processors, at operation 92, may perform a boot operation and synchronization and registration operation in advance of the certain time on those days (e.g., proceed with a ramp-up process indicated by paths 80 and 84 in FIG. 10). In this example, the one or more processors may receive information such as weekly calendar events, a day of the week, a time of the day, activity information of a user opening a weather application, etc. and may determine this scenario based on the received information.

As a contrasting example, in a scenario where a user routinely carries device 10-1 away from device 10-2 on certain days of the week but at uncertain times, the one or more processors, at operation 92, may perform only a boot operation in advance of a general time period encompassing the times on those days (e.g., proceed with a ramp-up process indicated by path 82 in FIG. 10). If desired, near the end of the general time period, if the user has not yet carried device 10-1 away from device 10-2, the one or more processors at operation 92 may perform synchronization and registration operations and step back into a low-power idle mode (e.g., via path 86 in FIG. 10) as it may be more likely that the user carry device 10-1 away from device 10-2 soon.

As another example, in a scenario where devices 10-1 and 10-2 are connected to the same wireless access point associated with a known home network, it may be more likely for devices 10-1 and 10-2 to be separated and link 32-1 may be terminated (e.g., the user may leave different devices in different room). The one or more processors receiving information indicative of this scenario, may proceed with paths 80 and 86 in FIG. 10 or via path 82 in FIG. 10 to prepare for separation between device 10-1 and 10-2 and termination of link 32-1, which may be more common when the devices 10-1 and 10-2 are connected to a known home network compared to a public network.

These examples are merely illustrative. In general, the one or more processors may gather any suitable information useable to characterize an eventual termination of link 32-1 (e.g., an expected remaining duration link 32-1, the certainty of the eventual termination or expected remaining duration, etc.) at operation 90, and select a corresponding ramp-up sequence (e.g., in FIG. 10) for operating radio 26 (e.g., a cellular radio component).

The foregoing is merely illustrative and various modifications can be made to the described embodiments. The foregoing embodiments may be implemented individually or in any combination.

What is claimed is:

1. A wireless communication device comprising:
    a first radio component operable to establish a first wireless communication link with an external device;
    a second radio component operable to establish a second wireless communication link with external network equipment and operable in a plurality of modes, each mode of the plurality of modes having a different power consumption characteristic; and
    one or more processors configured to
        receive information indicative of a duration of the first wireless communication link, and
        operate, when the first wireless communication link is active, the second radio component in a first mode of the plurality of modes based on the duration of the first wireless communication link being a first duration and in a second mode of the plurality of modes based on the duration of the first wireless communication link being a second duration.

2. The wireless communication device of claim 1, wherein the first mode exhibits a cumulative power consumption value for the first duration of the first wireless communication link that is less than a corresponding cumulative power consumption value for the first duration of the first wireless communication link exhibited by the second mode.

3. The wireless communication device of claim 1, wherein the first mode is an idle mode, a radio-off mode, or an airplane mode.

4. The wireless communication device of claim 1, wherein the first mode is an idle mode, during which the second radio component performs discontinuous reception using the second wireless communication link while omitting network paging detection.

5. The wireless communication device of claim 1, wherein the second radio component is a cellular radio component and the external network equipment is associated with a cellular network.

6. The wireless communication device of claim 5, wherein the first radio component is a non-cellular radio component.

7. The wireless communication device of claim 1, wherein the one or more processors are configured to receive the information indicative of the duration of the first wireless communication link using the first wireless communication link.

8. The wireless communication device of claim 1, wherein the information indicative of the duration of the first wireless communication link is associated with a third device separate from the wireless communication device and the external device.

9. The wireless communication device of claim 1, wherein the one or more processors are configured to receive additional information indicative of a termination of the first wireless communication link and to operate the second radio component based on the additional information.

10. The wireless communication device of claim 9, wherein the one or more processors are configured to operate the second radio component to perform a ramp-up sequence that configures the second radio component for an idle mode of operation based on the additional information.

11. Wireless circuitry comprising:
    one or more processors configured to
        receive information indicative of a duration of a first wireless communication link communicatively coupling a first radio component to an external device, and
        operate, when the first wireless communication link is being used, a second radio component in a first mode based on the duration of the first wireless communication link being greater than a given duration and in a second mode based on the duration of the first wireless communication link being less than the given duration, the first and second modes having different power consumption characteristics and the second radio component being configured to communicatively couple to external network equipment via a second wireless communication link.

12. The wireless circuitry of claim 11, wherein the first mode exhibits a cumulative power consumption value that is less than a corresponding cumulative power consumption value exhibited by the second mode when the duration of the first wireless communication link is greater than the given duration.

13. The wireless circuitry of claim 11, wherein the second radio component is a cellular radio component and the external network equipment is associated with a cellular network.

14. The wireless circuitry of claim 13, wherein the first radio component is a non-cellular radio component.

15. The wireless circuitry of claim 11, wherein the one or more processors are configured to
    receive additional information indicative of a termination of the first wireless communication link, and
    operate the second radio component based on the received additional information indicative of the termination of the first wireless communication link.

16. The wireless circuitry of claim 15, wherein the one or more processors are configured to operate the second radio component based on the received additional information by operating the second radio component to perform a boot up operation at a first time and to perform synchronization and registration operations at a second time, the first and second times being based on the received additional information indicative of the termination of the first wireless communication link.

17. The wireless circuitry of claim 15, wherein the one or more processors are configured to operate the second radio component based on the received additional information by operating the second radio component to perform synchronization and registration operations and to switch to a reduced-power state until the termination of the first wireless communication link.

18. A method of wireless communication comprising:
    receiving, by one or more processors, information indicative of a duration of a first wireless communication link communicatively coupling a first radio component to an external device; and
    when the first wireless communication link is being used, operating, by the one or more processors, a second radio component in a first mode based on the duration of the first wireless communication link being less than a given duration and in a second mode based on the duration of the first wireless communication link being greater than the given duration, the first and second modes having different power consumption characteristics and the second radio component being configured to communicatively couple to external network equipment via a second wireless communication link.

19. The method of claim 18, wherein the second radio component is a cellular radio component and the external network equipment is associated with a cellular network and wherein the first radio component is a non-cellular radio component.

20. The method of claim 18,
wherein the first mode exhibits a cumulative power consumption value that is less than a corresponding cumulative power consumption value exhibited by the second mode when the duration of the first wireless communication link is less than the given duration.

* * * * *